United States Patent
Clifford

(10) Patent No.: US 9,292,371 B1
(45) Date of Patent: Mar. 22, 2016

(54) SYSTEMS AND METHODS FOR PREVENTING FAILURES OF NODES IN CLUSTERS

(71) Applicant: Symantec Corporation, Mountain View, CA (US)

(72) Inventor: Thomas G. Clifford, Edina, MN (US)

(73) Assignee: Symantec Corporation, Mountain View, CA (US)

(*) Notice: Subject to any disclaimer, the term of this patent is extended or adjusted under 35 U.S.C. 154(b) by 100 days.

(21) Appl. No.: 14/103,160

(22) Filed: Dec. 11, 2013

(51) Int. Cl.
*G06F 11/00* (2006.01)
*G06F 11/07* (2006.01)
*H04L 12/26* (2006.01)

(52) U.S. Cl.
CPC ............ *G06F 11/0757* (2013.01); *H04L 43/10* (2013.01)

(58) Field of Classification Search
CPC ............ G06F 11/0709; G06F 11/0757; G06F 11/3006; G06F 11/3072; H04L 43/10; H04L 43/103
See application file for complete search history.

(56) References Cited

U.S. PATENT DOCUMENTS

| | | | | |
|---|---|---|---|---|
| 6,370,656 | B1* | 4/2002 | Olarig et al. | 714/23 |
| 6,782,496 | B2* | 8/2004 | Fleming | 714/55 |
| 7,206,836 | B2* | 4/2007 | Dinker et al. | 709/224 |
| 8,214,823 | B2* | 7/2012 | Tsuchiya et al. | 717/171 |
| 2007/0112954 | A1* | 5/2007 | Ramani et al. | 709/224 |
| 2015/0019900 | A1* | 1/2015 | Griffith et al. | 714/4.11 |

OTHER PUBLICATIONS

"Load-Balanced Cluster", https://msdn.microsoft.com/en-us/library/ff648960.aspx, as accessed Oct. 2, 2013, Microsoft, (May 8, 2010).
Ausavarungnirun, Rachata et al., "Adaptive Cluster Throttling: Improving High-Load Performance in Bufferless On-Chip Networks", https://www.ece.cmu.edu/~safari/tr/tr-2011-006.pdf, as accessed Oct. 2, 2013, SAFARI Technical Report No. 2011-006, (Sep. 6, 2011).
"SOL9125: Overview of Dynamic Ratio load balancing", https://support.f5.com/kb/en-us/solutions/public/9000/100/soI9125.html, as accessed Oct. 2, 2013, AskF5 Home, (Sep. 3, 2008).

* cited by examiner

*Primary Examiner* — Joseph Kudirka
(74) *Attorney, Agent, or Firm* — ALG Intellectual Property, LLC

(57) ABSTRACT

A computer-implemented method for preventing failures of nodes in clusters may include (1) identifying a node that is part of a cluster of nodes and that communicates, via a heartbeat sent at a regular interval to the cluster, that the node is functional and connected to the cluster, (2) calculating a current workload for the node based on a utilization of computing resources on the node, (3) determining, based on the current workload, that the node is functional and connected but is in an excessive load condition and a failure to send the heartbeat within the regular interval is due to the excessive load condition, and (4) setting a new interval for the heartbeat of the node that is longer than the regular interval in response to determining that the node cannot send the heartbeat at the regular interval. Various other methods, systems, and computer-readable media are also disclosed.

20 Claims, 7 Drawing Sheets

SYSTEMS AND METHODS FOR PREVENTING FAILURES OF NODES IN CLUSTERS

BACKGROUND

Cluster computing is an increasingly popular solution for a wide variety of computing problems. Use cases for clusters can range from equation-solving supercomputers to platforms for software as a service. One popular use for clusters is to provide high-availability services. Redundant nodes in high-availability clusters provide services even when one or more nodes have failed, allowing service to continue uninterrupted despite the failed nodes. Uninterrupted service can be very important for a wide variety of applications, including Internet commerce platforms and high-volume data storage systems.

Unfortunately, high-availability clusters may sometimes suffer from widespread node failures, interrupting service despite the precautions taken in the cluster's design. Traditional systems may assign the workload from a failed node to a new node, which then may also fail, causing a cascading failure condition. These traditional systems may classify a node as failed when the node neglects to send a heartbeat within a specified interval, even if the node remains otherwise functional. Accordingly, the instant disclosure identifies and addresses a need for additional and improved systems and methods for preventing failures of nodes in clusters.

SUMMARY

As will be described in greater detail below, the instant disclosure generally relates to systems and methods for preventing failures of nodes in clusters by setting longer intervals for node heartbeats in the case of excessive load conditions that may prevent the nodes from sending heartbeats at the regular interval.

In one example, a computer-implemented method for preventing failures of nodes in clusters may include (1) identifying a node that is part of a cluster of nodes and that communicates, via a heartbeat sent at a regular interval to the cluster of nodes, that the node is functional and connected to the cluster of nodes, (2) calculating a current workload being processed by the node based on a utilization of computing resources on the node, (3) determining, based on the current workload, that the node is functional and connected but is in an excessive load condition due to the current workload and a failure by the node to send the heartbeat within the regular interval is due to the excessive load condition, and (4) dynamically setting a new interval for the heartbeat of the node that is longer than the regular interval for the heartbeat in response to determining that the node cannot send the heartbeat at the regular interval due to the excessive load condition.

In one embodiment the cluster of nodes may be configured to save deduplicated data on a shared storage system. In this embodiment, the cluster may also include a metadata owner that is configured to distribute computing jobs among the cluster of nodes and perform deduplication fingerprinting, and a control system that is configured to determine resource allocation for the cluster of nodes.

The control system may also perform a variety of other functions, including distributing computing jobs to the cluster of nodes. In some examples, the control system may determine a new aggregate load limit for the cluster of nodes in response to a failure of the node due to the excessive load condition. Additionally or alternatively, the control system may remove at least one active computing job from the node to alleviate the excessive load condition. In some examples, the control system may calculate a new optimal workload for the node based at least in part on the utilization of computing resources on the node that led to the excessive load condition.

In one embodiment, determining that the node is in the excessive load condition may include determining that the excessive load condition will be resolved within a predefined time limit.

A number of responses to the excessive load condition are possible. In some examples, the computer-implemented method may further include stopping an additional computing job from being added to the node in response to the excessive load condition. Additionally or alternatively, the computer-implemented method may further include removing at least one computing job from the node in response to the excessive load condition.

The potential failure to send the heartbeat may also be responded to preemptively. In some examples, the computer-implemented method may include monitoring the current workload of the node and setting the new interval for the heartbeat of the node prior to the failure to send the heartbeat within the regular interval, preventing the failure to send the heartbeat. Additionally or alternatively, a control system may prevent the failure of the heartbeat by monitoring the current workload of the node and removing at least one computing job from the node prior to the failure to send the heartbeat within the regular interval. In some examples, dynamically setting the new interval for the heartbeat of the node before the failure of the heartbeat may prevent the node from being categorized as non-connected.

In one embodiment, the utilization of computing resources on the node may include: (1) memory utilization, (2) memory fragmentation, and/or (3) central processing unit (CPU) utilization.

In one embodiment, a system for implementing the above-described method may include (1) an identification module that identifies a node that is part of a cluster of nodes and that communicates, via a heartbeat sent at a regular interval to the cluster of nodes, that the node is functional and connected to the cluster of nodes, (2) a calculation module that calculates a current workload being processed by the node based on a utilization of computing resources on the node, (3) a determination module that determines, based on the current workload, that the node is functional and connected but is in an excessive load condition due to the current workload and a failure by the node to send the heartbeat within the regular interval is due to the excessive load condition, (4) a heartbeat module that dynamically sets a new interval for the heartbeat of the node that is longer than the regular interval for the heartbeat in response to determining that the node cannot send the heartbeat at the regular interval due to the excessive load condition, and (5) at least one processor configured to execute the identification module, the calculation module, the determination module, and the heartbeat module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a node that is part of a cluster of nodes and that communicates, via a heartbeat sent at a regular interval to the cluster of nodes, that the node is functional and connected to the cluster of nodes, (2) calculate a current workload being processed by the node based on a utilization of computing resources on the node, (3) determine, based on the current workload, that the node is functional and connected but is in an excessive load condition due to the current workload and a failure by the node to send the heartbeat within the regular interval is due to the excessive load condition, and (4) dynamically set a new interval for the heartbeat of the node that is longer than the regular interval for the heartbeat in response to determining that the node cannot send the heartbeat at the regular interval due to the excessive load condition.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
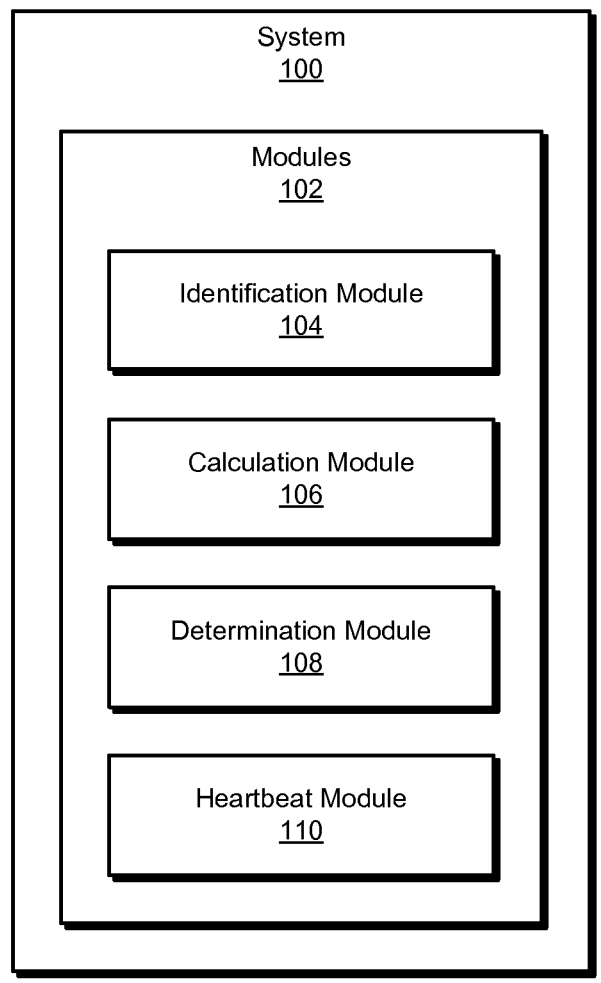
FIG. 1 is a block diagram of an exemplary system for preventing failures of nodes in clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing failures of nodes in clusters. As will be explained in greater detail below, by proactively adjusting the heartbeat interval to take into account the workload on a node, systems described herein may prevent functional but overloaded nodes from being categorized as non-functional. Preventing nodes from being categorized as non-functional may alleviate the need to move computing jobs from those nodes to additional nodes, reducing the risk that the additional nodes will become overloaded and cause a cascading failure situation for the cluster of nodes.

The following will provide, with reference to FIGS. 1, 2, 4 and 5, detailed descriptions of exemplary systems for preventing failures of nodes in clusters. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for preventing failures of nodes in clusters. As illustrated in this figure, exemplary system 100 may include one or more modules 102 for performing one or more tasks. For example, and as will be explained in greater detail below, exemplary system 100 may also include an identification module 104 that may identify a node that is part of a cluster of nodes and that communicates, via a heartbeat sent at a regular interval to the cluster of nodes, that the node is functional and connected to the cluster of nodes. Exemplary system 100 may additionally include a calculation module 106 that may calculate a current workload being processed by the node based on a utilization of computing resources on the node.

Exemplary system 100 may also include a determination module 108 that may determine, based on the current workload, that the node is functional and connected but is in an excessive load condition due to the current workload and a failure by the node to send the heartbeat within the regular interval is due to the excessive load condition. Exemplary system 100 may additionally include a heartbeat module 110 that may dynamically set a new interval for the heartbeat of the node that is longer than the regular interval for the heartbeat in response to determining that the node cannot send the heartbeat at the regular interval due to the excessive load condition. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., node 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
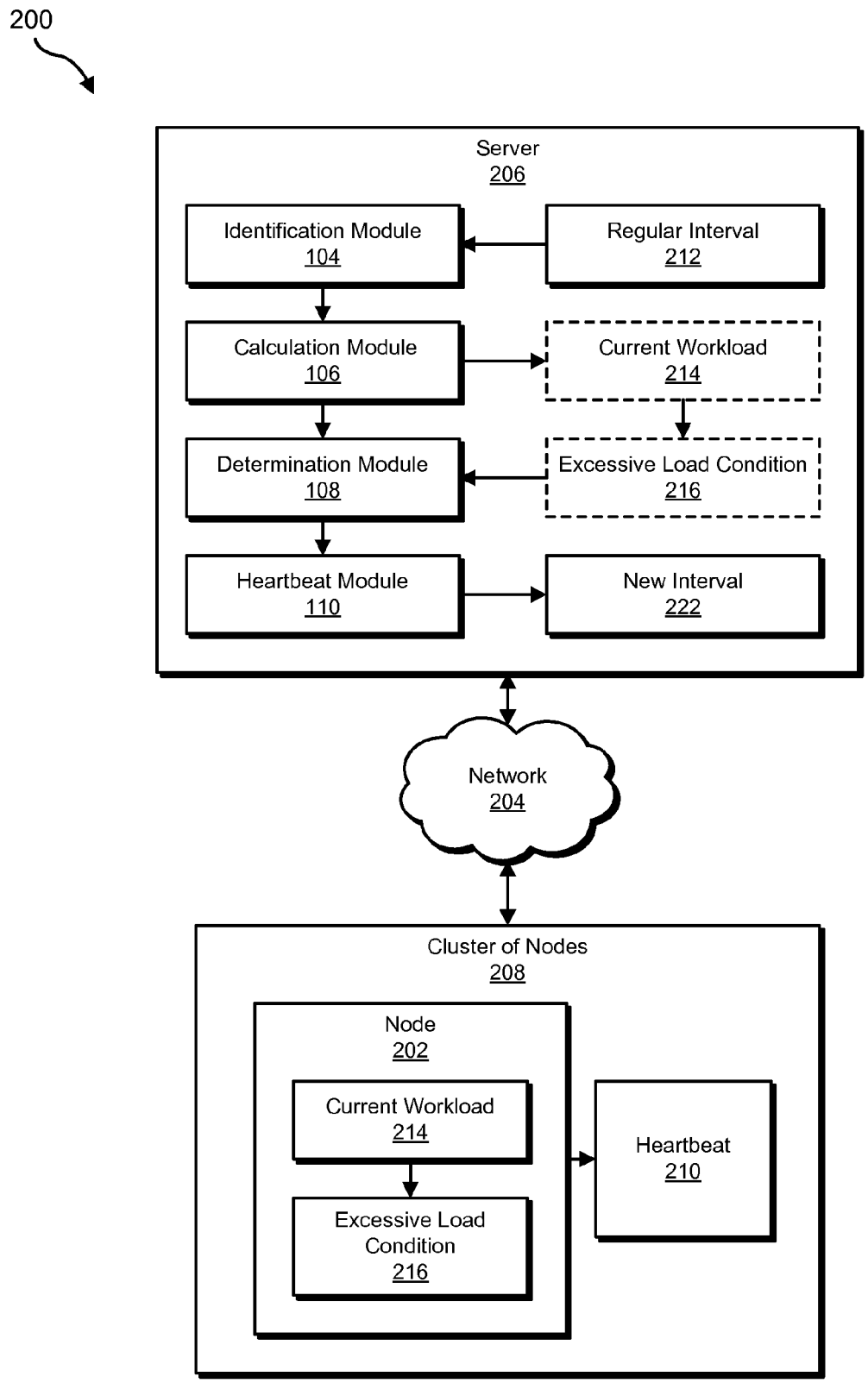
FIG. 2 is a block diagram of an additional exemplary system for preventing failures of nodes in clusters.

Exemplary system 100 in FIG. 1 may be implemented in a variety of ways. For example, all or a portion of exemplary system 100 may represent portions of exemplary system 200 in FIG. 2. As shown in FIG. 2, system 200 may include a node 202 in communication with a server 206 via a network 204. In one example, node 202 may be programmed with one or more of modules 102. Additionally or alternatively, server 206 may be programmed with one or more of modules 102.

In one embodiment, one or more of modules 102 from FIG. 1 may, when executed by at least one processor of node 202 and/or server 206, enable node 202 and/or server 206 to prevent failures of nodes in clusters. For example, and as will be described in greater detail below, one or more of modules 102 may cause node 202 and/or server 206 to identify, via identification module 104, node 202 that is part of a cluster of nodes 208 and that communicates, via a heartbeat 210 sent at a regular interval 212 to cluster of nodes 208, that node 202 is functional and connected to cluster of nodes 208. Calculation module 106 may be programmed to calculate a current workload 214 being processed by node 202 based on a utilization of computing resources on node 202. Determination module 108 may be programmed to determine, based on current workload 214, that node 202 is functional and connected but is in an excessive load condition 216 due to current workload 214, and that a failure by node 202 to send heartbeat 210 within regular interval 212 is due to the excessive load condition 216. Heartbeat module 110 may be programmed to dynamically set a new interval 222 for heartbeat 210 of node 202 that is longer than regular interval 212 for heartbeat 210 in response to determining that node 202 cannot send heartbeat 210 at regular interval 212 due to excessive load condition 216.

Node 202 generally represents any type or form of computing device capable of reading computer-executable instructions. Examples of node 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of communicating with a cluster of nodes. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between node 202, cluster of nodes 208, and/or server 206.

Figure 3:
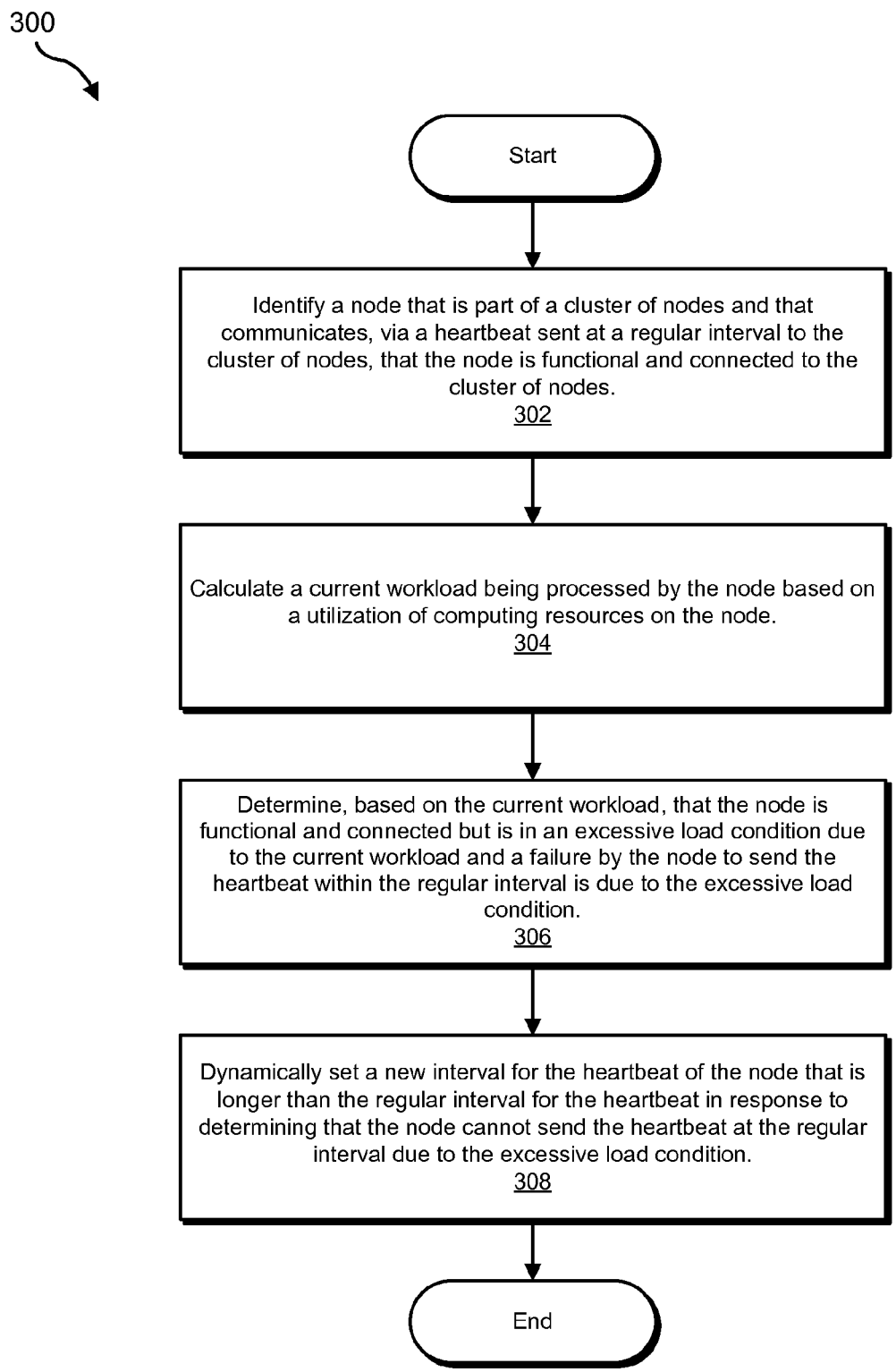
FIG. 3 is a flow diagram of an exemplary method for preventing failures of nodes in clusters.

FIG. 3 is a flow diagram of an exemplary computer-implemented method 300 for preventing failures of nodes in clusters. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a node that is part of a cluster of nodes and that communicates, via a heartbeat sent at a regular interval to the cluster of nodes, that the node is functional and connected to the cluster of nodes. For example, at step 302 identification module 104 may, as part of server 206 in FIG. 2, identify node 202 that is part of cluster of nodes 208 and that communicates, via heartbeat 210 sent at regular interval 212 to cluster of nodes 208, that node 202 is functional and connected to cluster of nodes 208.

The phrase "cluster of nodes," as used herein, generally refers to any set of connected computing devices. For example, a cluster of nodes may include a number of servers that are configured to perform a computing task and that are connected by a network. In one example, a cluster of nodes may include nodes configured to perform data deduplication and a metadata owner configured to distribute deduplication jobs among the nodes. Examples of a cluster of nodes include a high availability NETBACKUP 5400 appliance configured to save deduplicated data to a shared storage system.

The term "heartbeat," as used herein, generally refers to any communication which may be sent by a computing device at a scheduled interval. For example, a heartbeat may be sent from a node within a cluster of nodes at a regular interval in order to communicate that the node is functional and/or connected to the cluster. In some examples, a heartbeat may also be used to synchronize parts of a distributed system such as a cluster of nodes. In one example, a cluster of nodes may include a metadata owner and a clustered file system and/or may be managed by high-availability clustering software. In this example, the metadata owner and/or clustered file system may be dependent on heartbeats provided by the high-availability clustering software, and/or may use the heartbeats to manage faults, failovers, and/or split brain scenarios.

The phrase "regular interval," as used herein, generally refers to any predetermined length of time and/or scheduled time. Examples of a regular interval may include every 30 seconds, every 90 seconds, and/or every minute on the minute mark. Additionally or alternatively, a regular interval between events (such as heartbeats) may be defined by a predetermined length of time since a previous event. For example, a regular interval between heartbeats may indicate no more than 45 seconds between any two heartbeats.

Identification module 104 may identify the node in a variety of ways and contexts. For example, identification module 104 may identify a computing device that is connected to a cluster of computing devices all configured to perform similar computing tasks, and that sends a heartbeat to other computing devices in the cluster.

In one example, identification module 104 may identify a media server in a cluster of servers that is configured to save deduplicated data to a shared storage system, and that communicates with the cluster via a heartbeat.

At step 304 one or more of the systems described herein may calculate a current workload being processed by the node based on a utilization of computing resources on the node. For example, at step 304 calculation module 106 may, as part of server 206 in FIG. 2, calculate current workload 214 being processed by the node based on a utilization of computing resources on the node.

The term "workload," as used herein, generally refers to the usage of resources on a computing device to perform the computing jobs being processed by a computing device. For example, a node consuming 90% of its CPU to process a large number of computing jobs may be considered to have a large workload, while a node consuming 10% of its CPU to process a small number of computing jobs may have a small workload.

Calculation module 106 may calculate the current workload in any or all of a variety of ways. For example, calculation module 106 may calculate the current workload by analyzing memory usage and/or CPU utilization on the node.

In some examples, the utilization of computing resources on the node may include memory utilization, memory fragmentation, and/or central processing unit utilization. Utilization of computing resources may also include specific types of processes and/or activities, such as copying a file, or fingerprinting data for deduplication.

Figure 5:
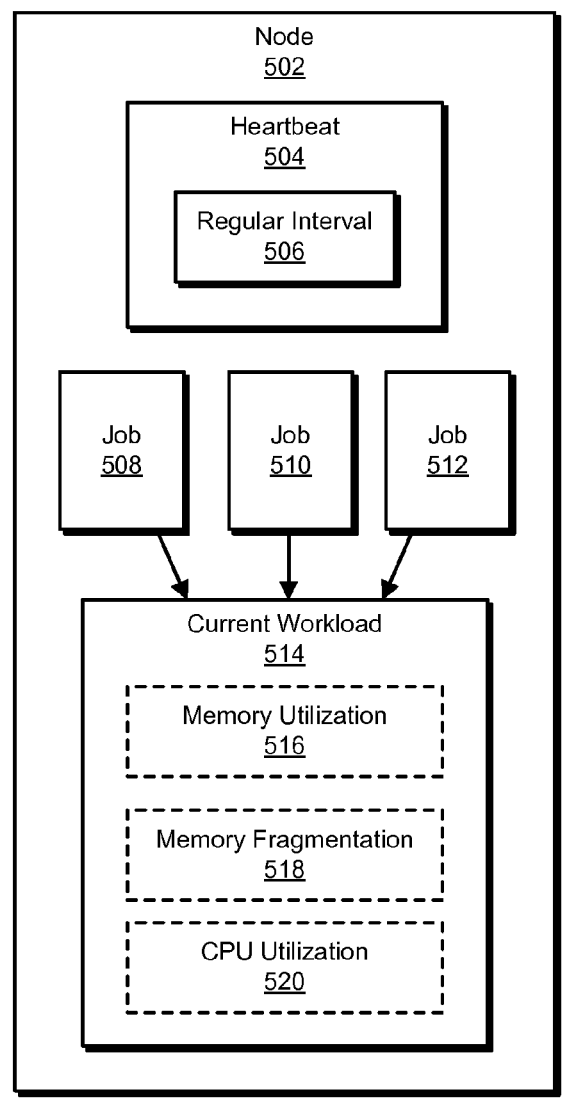
FIG. 5 is a block diagram of an exemplary system for preventing failures of nodes in clusters.

The computing jobs on a node may contribute to the utilization of computing resources on the node. FIG. 5 is a block diagram of a node within an exemplary computing system 500 for preventing failures of nodes in clusters. Node 502 may include a heartbeat 504, jobs 508, 510 and/or 512, and/or a current workload 514. Heartbeat 504 may be sent at regular interval 506. Jobs 508, 510 and/or 512 may contribute to current workload 514, which may include memory utilization 516, memory fragmentation 518, and/or CPU utilization 520. Removing job 508, 510 and/or 512 may decrease workload 514, leading to decreased memory utilization 516, memory fragmentation 518, and/or CPU utilization 520. Adding additional jobs to node 502 may increase workload 514, leading to increased memory utilization 516, memory fragmentation 518, and/or CPU utilization 520, and also potentially leading to an excessive load condition.

Returning to FIG. 3, at step 306 one or more of the systems described herein may determine, based on the current workload, that the node is functional and connected but is in an excessive load condition due to the current workload and a failure by the node to send the heartbeat within the regular interval is due to the excessive load condition. For example, at step 306 determination module 108 may, as part of server 206 in FIG. 2, determine, based on current workload 214, that node 202 is functional and connected but is in an excessive load condition 216 due to current workload 214, and that a failure by node 202 to send heartbeat 210 within regular interval 212 is due to the excessive load condition 216.

The phrase "excessive load condition," as used herein, generally refers to any condition in which the workload on a computing device causes the computing device to be unable to carry out a regularly scheduled function at the predetermined time. For example, an excessive load condition may cause a node in a computing cluster to be unable to send a heartbeat at the regular interval.

The term "functional," as used herein, generally refers to any state in which a computing device may be capable of processing computing jobs and/or performing computing tasks. A computing device may be functional even if that computing device is not performing at full capacity. For example, a node may be functional even if a background task is consuming 80% of the CPU and the node is only capable of performing data deduplication at half the normal rate.

The term "connected," as used herein, generally refers to any state in which a computing device is capable of communicating with other computing devices. A computing device may be connected even if that computing device is affected by transmission problems, so long as those transmission problems do not affect all of the data being transmitted from or to the computing device. For example, a node may be classified as connected to a cluster even if the node is affected by severe lag and may not send heartbeat data at the expected interval.

Determination module 108 may determine that the node is functional and connected but in an excessive load condition in any of a variety of ways and contexts. For example, determination module 108 may determine that the node is in an excessive load condition by comparing the workload on the node to a predetermined threshold for excessive load conditions. In one example, determination module 108 may determine that the node is functional and connected by monitoring the computing jobs being processed by the node and determining that computing jobs are still being completed by the node.

In some examples, determination module 108 may determine that the node is functional and connected but in an excessive load condition by determining the root cause of the excessive load condition. For example, the excessive load condition may be caused by an internally controlled operation, externally controlled operation, and/or background task. In some embodiments, determination module 108 may use this data to improve future task scheduling for the node.

In some embodiments, determination module 108 may determine, based on the current workload, that the node is in the excessive load condition by determining that the excessive load condition will be resolved within a predefined time limit. For example, determination module 108 may determine that the excessive load condition is caused by a background task on the node which will be completed within ten minutes.

At step 308 one or more of the systems described herein may dynamically set a new interval for the heartbeat of the node that is longer than the regular interval for the heartbeat in response to determining that the node cannot send the heartbeat at the regular interval due to the excessive load condition. For example, at step 308 heartbeat module 110 may, as part of server 206 in FIG. 2, dynamically set new interval 222 for heartbeat 210 of node 202 that is longer than regular interval 212 for heartbeat 210 in response to determining that node 202 cannot send heartbeat 210 at regular interval 212 due to excessive load condition 216.

Heartbeat module 110 may set the new interval in a variety of ways and contexts. For example, heartbeat module 110 may set a new interval for the heartbeat of a node by calculating a new interval that allows the node to send the heartbeat despite the excessive load condition suffered by the node by calculating the new interval based on the workload of the node. In one example, heartbeat module 110 may set the new interval for the node to five minutes based on the CPU utilization on the node reaching 99%.

In some examples, heartbeat module 110 dynamically setting the new interval for the heartbeat of the node may prevent the node from being categorized as non-connected. For example, heartbeat module 110 may monitor the current workload of the node and set the new interval for the heartbeat of the node prior to the failure to send the heartbeat within the regular interval, preventing the failure to send the heartbeat. In one example, a node may have a heartbeat with a regular interval of 30 seconds and be unable to send the heartbeat at the regular interval. Heartbeat module 110 may dynamically set the new interval to 90 seconds based on the utilization of resources on the node. The node may successfully send the heartbeat every 90 seconds and continue to be categorized as connected, whereas an interval of 30 seconds may have caused the node to miss sending a heartbeat within the required interval and thus be categorized as non-connected.

Additionally or alternatively, heartbeat module 110 may set the new interval by ignoring at least one missed heartbeat. For example, the node may have a regular interval of 30 seconds but may miss a heartbeat, resulting in sending the heartbeat at an interval of 60 seconds. In this example, heartbeat module 110 may ignore the missed heartbeat and function as if the new interval were 60 seconds.

In some embodiments, heartbeat module 110 may reset the interval to the regular interval once the excessive load condition has been resolved. For example, systems described herein may determine that the CPU utilization on the node has dropped from 99% to 80% and the excessive load condition is now resolved. In this example heartbeat module 110 may reset the interval for the heartbeat from the new interval of 90 seconds back to the regular interval of 30 seconds.

In some examples, systems described herein may stop an additional computing job from being added to the node in response to the excessive load condition. Additionally or alternatively, systems described herein may remove at least one computing job from the node in response to the excessive load condition. These steps may more quickly alleviate the excessive load condition.

Figure 4:
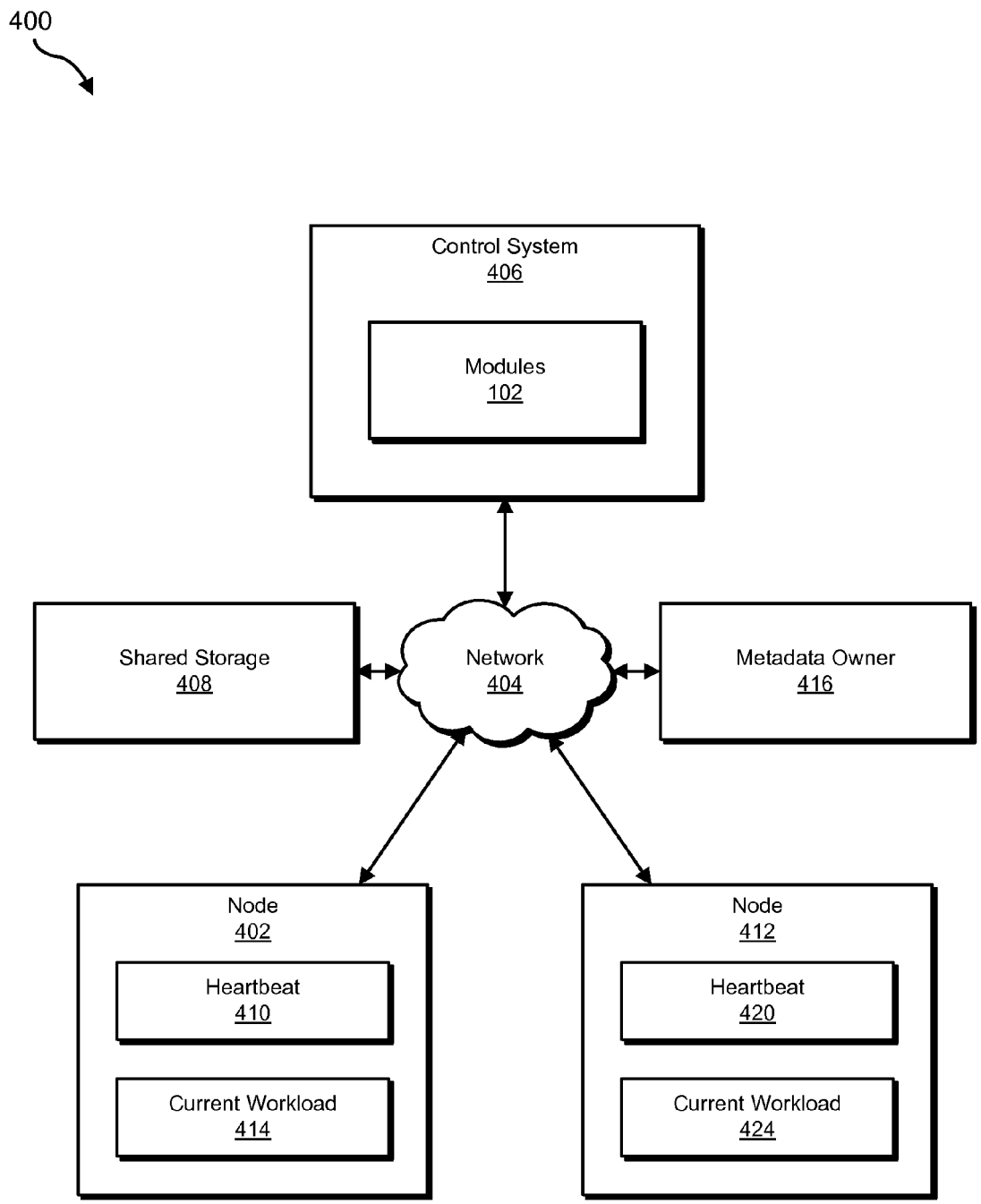
FIG. 4 is a block diagram of an exemplary system for preventing failures of nodes in clusters.

In one embodiment, the cluster of nodes may communicate with a control system that distributes computing jobs to the cluster of nodes. The control system may also perform a variety of other functions. In some examples, the cluster of nodes may be configured to save deduplicated data on a shared storage system, the cluster of nodes may include a metadata owner that is configured to distribute computing jobs among the cluster of nodes and perform deduplication fingerprinting, and/or the control system may be configured to determine resource allocation for the cluster of nodes. FIG. 4 is a block diagram of an exemplary computing system 400 for preventing failures of nodes in clusters that communicate with a control system.

As illustrated in FIG. 4, control system 406 may include modules 102 and/or may communicate with shared storage 408, metadata owner 416, node 402 and/or node 412 via network 404. Node 402 may include heartbeat 410 and/or current workload 414. Node 412 may include heartbeat 420 and/or current workload 424. Metadata owner 416 may receive computing jobs from control system 406 and/or may distribute computing jobs to node 402 and/or node 412. Metadata owner 416 may perform other functions, including appliance name resolution. Node 402 may send heartbeat 410 to control system 406 and/or metadata owner 416. Node 402 may also store deduplicated data to shared storage 408. In some examples, control system 406 and/or metadata owner 416 may use workload 420 to determine whether or not to assign additional computing jobs to node 402.

In one embodiment, the control system may determine a new aggregate load limit for the cluster of nodes in response to a failure of the node due to the excessive load condition. In one example, node 402 may fail due to workload 420 causing an excessive load condition. In this example, control system 406 may determine a lower aggregate load limit for computing jobs on the cluster of nodes than the aggregate load limit in place when node 402 was functional.

Additionally or alternatively, the control system may remove at least one active computing job from the node to alleviate the excessive load condition. For example, control system 406 may determine that workload 420 is consuming sufficient resources on node 402 to trigger an excessive load condition, and may remove a computing job from workload 420 in order to alleviate the excessive load condition on node 402.

In some examples, the control system may calculate a new optimal workload for the node based at least in part on the utilization of computing resources on the node that led to the excessive load condition. For example, control system 406 may determine that node 402 is suffering from an excessive load condition, and may calculate a new optimal workload that is different from workload 420 and that consumers fewer resources than workload 420. In one example, workload 420 may consume 99% of the CPU of node 402, leaving insufficient CPU cycles to send heartbeat 410 at the regular interval, and the new optimal workload may be calculated to consume only 90% of the CPU of node 402.

As explained above in connection with method 300 in FIG. 3, systems described herein may identify a cluster of nodes that communicate via a heartbeat. In some embodiments, this cluster may be configured to save deduplicated data to a shared storage system, and/or may communicate with a control system that assigns deduplication jobs to the cluster.

Systems described herein may determine, based on the resource utilization on a node, that the node is in an excessive load condition. In some examples, the node may be affected by CPU overload, insufficient memory, and/or memory fragmentation. The node may be functional and capable of continuing to perform computing jobs, but may be too overloaded to send the heartbeat at the regular interval expected by the cluster. Systems described herein may then calculate a new, longer interval for the heartbeat for the duration of the excessive load condition so that the node is not incorrectly classified as failed.

The control system may also take a variety of additional steps to alleviate the excessive load condition including determining a new aggregate load limit for the cluster, preventing new computing jobs from being added to the overloaded node, and/ory removing at least one computing job from the overloaded node. In some examples, any or all of these steps may be taken after the excessive load condition is detected but before the node fails to send the heartbeat at the regular interval. By preventing the node from being classified as failed, systems described herein can avoid triggering a cascading failure condition across the cluster, reducing the chances of an interruption in service being caused by an overloaded node's failure to send a heartbeat.

Figure 6:
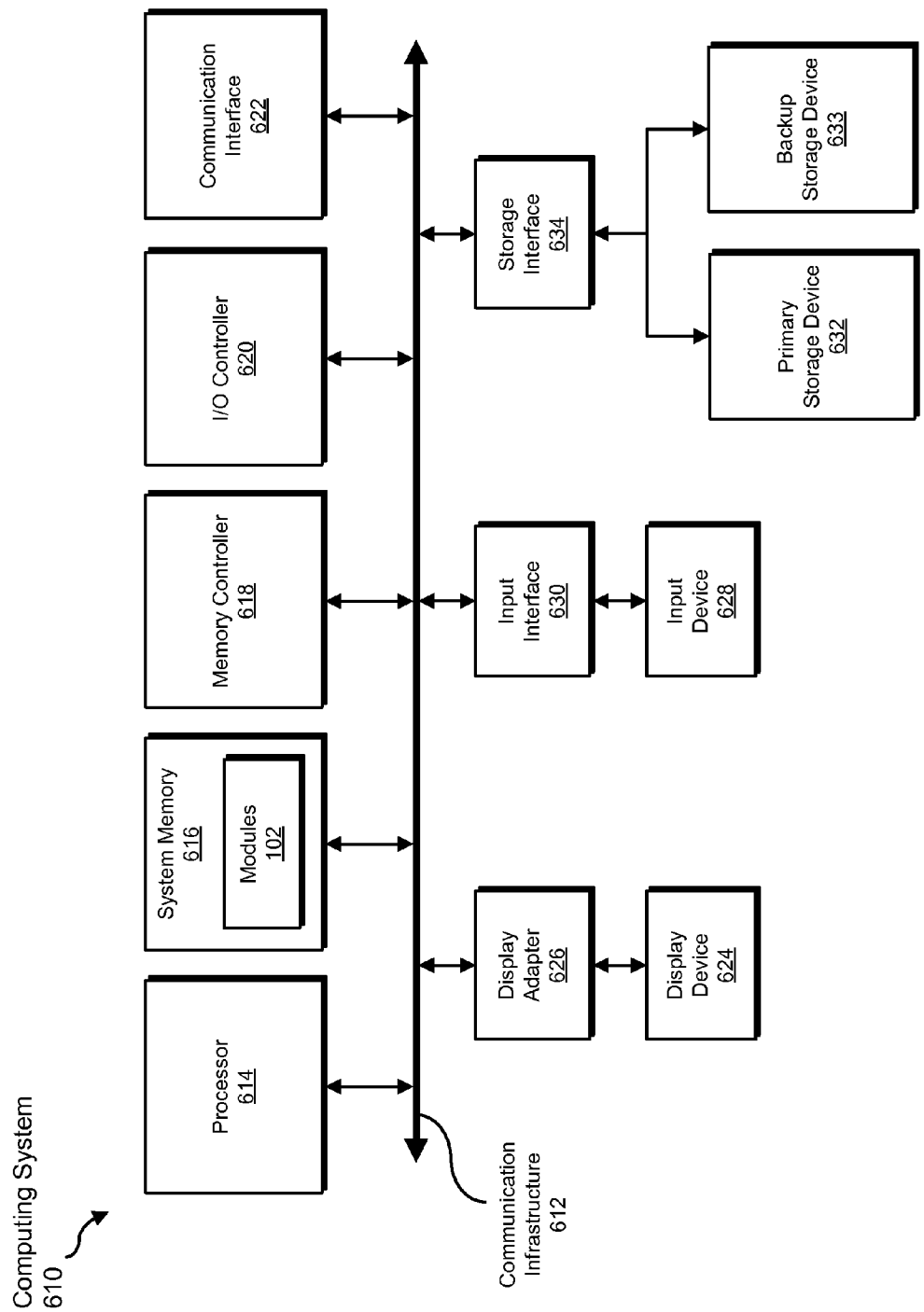
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
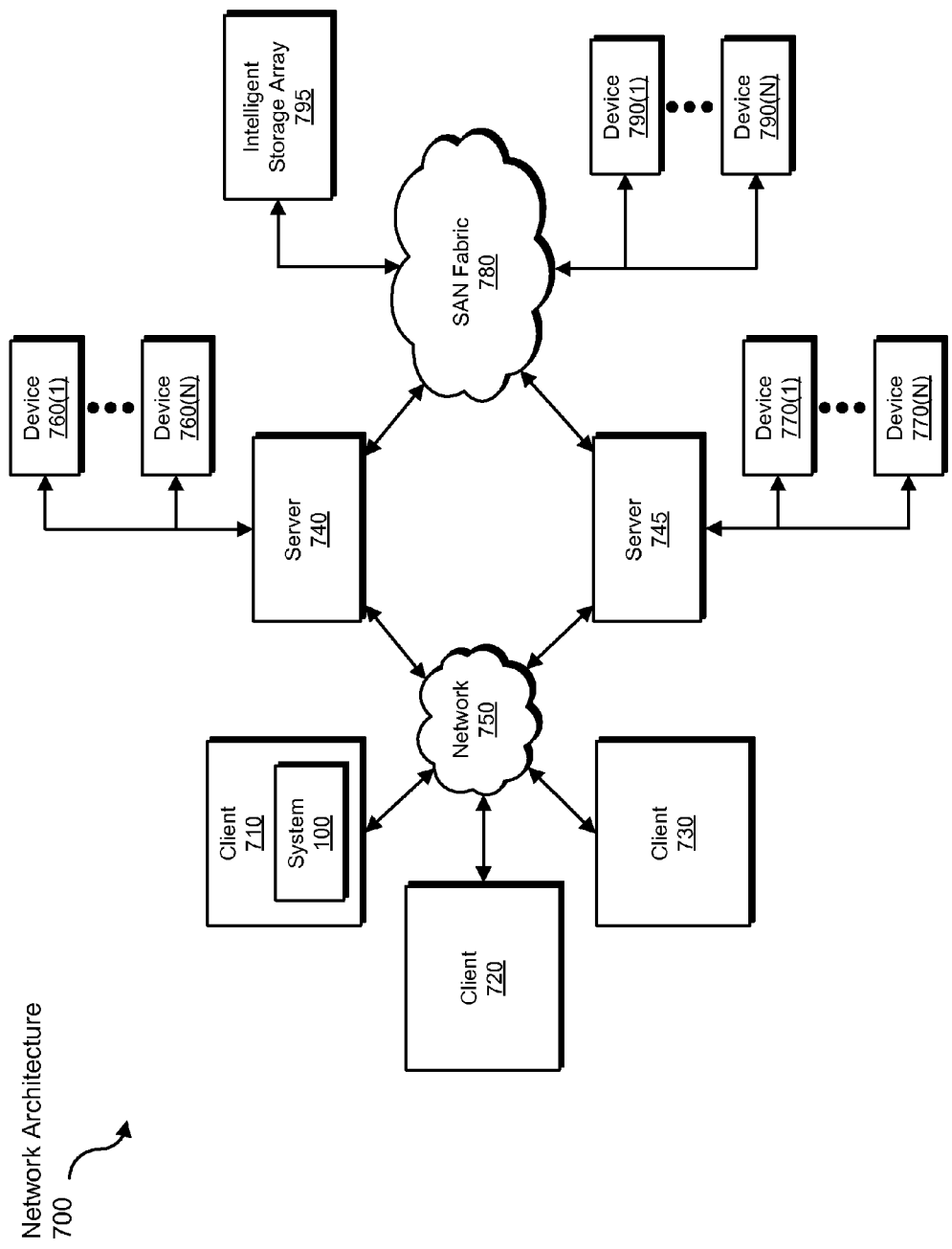
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for preventing failures of nodes in clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive resource utilization data to be transformed, transform the resource utilization data, output a result of the transformation to a calculation module, use the result of the transformation to calculate a workload, and store the result of the transformation to a determination module. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing failures of nodes in clusters, at least a portion of the method being performed by a computing device comprising at least one processor, the method comprising:
   identifying a node that is part of a cluster of nodes and that communicates, via a heartbeat sent at a regular interval to the cluster of nodes, that the node is functional and connected to the cluster of nodes;
   calculating a current workload being processed by the node based on a utilization of computing resources on the node;
   determining, based on the current workload, that:

the node is functional and connected but is in an excessive load condition due to the current workload; and a failure by the node to send the heartbeat within the regular interval is due to the excessive load condition; and dynamically setting a new interval for the heartbeat of the node that is longer than the regular interval for the heartbeat in response to determining that the node cannot send the heartbeat at the regular interval due to the excessive load condition.

2. The computer-implemented method of claim 1, wherein the cluster of nodes communicates with a control system that distributes computing jobs to the cluster of nodes.

3. The computer-implemented method of claim 2, wherein the control system determines a new aggregate load limit for the cluster of nodes in response to a failure of the node due to the excessive load condition.

4. The computer-implemented method of claim 2, wherein the control system removes at least one active computing job from the node to alleviate the excessive load condition.

5. The computer-implemented method of claim 2, wherein the control system calculates a new optimal workload for the node based at least in part on the utilization of computing resources on the node that led to the excessive load condition.

6. The computer-implemented method of claim 2, wherein:
the cluster of nodes is configured to save deduplicated data on a shared storage system;
the cluster of nodes comprises a metadata owner that is configured to distribute computing jobs among the cluster of nodes and perform deduplication fingerprinting; and
the control system is configured to determine resource allocation for the cluster of nodes.

7. The computer-implemented method of claim 1, wherein determining, based on the current workload, that the node is in the excessive load condition comprises determining that the excessive load condition will be resolved within a predefined time limit.

8. The computer-implemented method of claim 1, further comprising stopping an additional computing job from being added to the node in response to the excessive load condition.

9. The computer-implemented method of claim 1, further comprising removing at least one computing job from the node in response to the excessive load condition.

10. The computer-implemented method of claim 1, further comprising monitoring the current workload of the node and setting the new interval for the heartbeat of the node prior to the failure to send the heartbeat within the regular interval, preventing the failure to send the heartbeat.

11. The computer-implemented method of claim 1, further comprising monitoring the current workload of the node and removing at least one computing job from the node prior to the failure to send the heartbeat within the regular interval.

12. The computer-implemented method of claim 1, wherein the utilization of computing resources on the node comprises at least one of:
memory utilization;
memory fragmentation; and
central processing unit utilization.

13. The computer-implemented method of claim 1, wherein dynamically setting the new interval for the heartbeat of the node prevents the node from being categorized as non-connected.

14. A system for preventing failures of nodes in clusters, the system comprising:
an identification module stored in memory that identifies a node that is part of a cluster of nodes and that communicates, via a heartbeat sent at a regular interval to the cluster of nodes, that the node is functional and connected to the cluster of nodes;
a calculation module stored in memory that calculates a current workload being processed by the node based on a utilization of computing resources on the node;
a determination module stored in memory that determines, based on the current workload, that:
the node is functional and connected but is in an excessive load condition due to the current workload; and
a failure by the node to send the heartbeat within the regular interval is due to the excessive load condition;
a heartbeat module stored in memory that dynamically sets a new interval for the heartbeat of the node that is longer than the regular interval for the heartbeat in response to determining that the node cannot send the heartbeat at the regular interval due to the excessive load condition; and
at least one processor configured to execute the identification module, the calculation module, the determination module, and the heartbeat module.

15. The system of claim 14, wherein the cluster of nodes communicates with a control system that distributes computing jobs to the cluster of nodes.

16. The system of claim 15, wherein the control system determines a new aggregate load limit for the cluster of nodes in response to a failure of the node due to the excessive load condition.

17. The system of claim 15, wherein the control system removes at least one active computing job from the node to alleviate the excessive load condition.

18. The system of claim 15, wherein the control system calculates a new optimal workload for the node based at least in part on the utilization of computing resources on the node that led to the excessive load condition.

19. The system of claim 15, wherein:
the cluster of nodes is configured to save deduplicated data on a shared storage system;
the cluster of nodes comprises a metadata owner that is configured to distribute computing jobs among the cluster of nodes and perform deduplication fingerprinting; and
the control system is configured to determine resource allocation for the cluster of nodes.

20. A non-transitory computer-readable-storage medium comprising one or more computer-readable instructions that, when executed by at least one processor of a computing device, cause the computing device to:
identify a node that is part of a cluster of nodes and that communicates, via a heartbeat sent at a regular interval to the cluster of nodes, that the node is functional and connected to the cluster of nodes;
calculate a current workload being processed by the node based on a utilization of computing resources on the node;
determine, based on the current workload, that:
the node is functional and connected but is in an excessive load condition due to the current workload; and
a failure by the node to send the heartbeat within the regular interval is due to the excessive load condition; and
dynamically set a new interval for the heartbeat of the node that is longer than the regular interval for the heartbeat in response to determining that the node cannot send the heartbeat at the regular interval due to the excessive load condition.

* * * * *